United States Patent [19]

Schmidt

[11] 4,170,966

[45] Oct. 16, 1979

[54] MIXTURE-COMPRESSING INTERNAL COMBUSTION ENGINE, ESPECIALLY FOUR-CYCLE ENGINE

[75] Inventor: Karl-Walter Schmidt, Weinstadt, Fed. Rep. of Germany

[73] Assignee: Daimler-Benz AG, Fed. Rep. of Germany

[21] Appl. No.: 770,564

[22] Filed: Feb. 22, 1977

[30] Foreign Application Priority Data

Feb. 25, 1976 [DE] Fed. Rep. of Germany ....... 2607561

[51] Int. Cl.$^2$ .......................... F02B 3/02; F02B 3/00; F02B 75/04; F02B 41/00
[52] U.S. Cl. ............ 123/32 SA; 123/59 BS; 123/65 S
[58] Field of Search ............. 123/32 SA, 59 BS, 65 S

[56] References Cited

U.S. PATENT DOCUMENTS

| | | | |
|---|---|---|---|
| 1,967,596 | 7/1934 | Schubert | 123/59 BS |
| 2,139,266 | 12/1938 | Harrison | 123/59 BS |
| 2,323,028 | 6/1943 | Glamann | 123/32 SA |
| 3,154,059 | 10/1964 | Witzky et al. | 123/32 SA |

FOREIGN PATENT DOCUMENTS 1224726  3/1971  United Kingdom ................ 123/32 SA

*Primary Examiner*—Harvey E. Behrend
*Assistant Examiner*—Thomas H. Webb
*Attorney, Agent, or Firm*—Craig and Antonelli

[57] ABSTRACT

A mixture-compressing internal combustion engine with a combustion space arranged either in the piston or in the cylinder head and with an ignition source located in the cylinder head; the main volume of the combustion space is thereby delimited by circular arcs, as viewed in plan view, of which the circular arc located closest to the ignition source is arranged at least approximately concentrically about the ignition source; a part of the piston which is matched within this area of the cylinder head adjoins the ignition source so closely that at first a smaller portion of the charge is ignited in the gap which is formed between the cylinder head and this piston part shortly prior to the end of the compression stroke while the main portion of the charge is combusted, at the earliest, beginning with the upper dead-center position of the piston.

21 Claims, 12 Drawing Figures

MIXTURE-COMPRESSING INTERNAL COMBUSTION ENGINE, ESPECIALLY FOUR-CYCLE ENGINE

The present invention relates to a mixture-compressing internal combustion engine, especially to a four-cycle engine, with a combustion space arranged in the piston or in the cylinder head and with an ignition source located in the cylinder head.

In prior art internal combustion engines with applied ignition, the ignition is initiated at that place in the combustion space where the mixture has collected in the most compact manner in order to obtain, in addition to short combustion paths, a short combustion duration with rapid conversion of the chemical energy of the mixture into heat energy.

A combustion of the mixture of short duration together with a low content of harmful components of the exhaust gases is to be achieved by such measures.

However, the gap spaces outside of the compact combustion space part up to the seals are disadvantageous in internal combustion engines of this type because only an imcomplete combustion of the mixture takes place in these narrow spaces. With an increase of the compression ratio, the volume proportion of the gap spaces would necessarily increase, which leads to an unavoidable increase in hydrocarbons in the exhaust gas and additionally would become effective in an unfavorable manner on the fuel consumption.

It is now the aim of the present invention to so influence by special measures the combustion progress in such types of internal combustion engines that an energy conversion takes place as a result of a shortened combustion duration of the main part of the mixture charge and as a result of increased compression ratios, which enables a reduction of the fuel and a lowering of the proportion of hydrocarbons in the exhaust gas.

The underlying problems are solved according to the present invention in that the main volume of the combustion space—as viewed in plan view—is delimited by circular arcs, of which the circular arc located closest to the ignition source is arranged concentrically or approximately concentrically to the ignition source, which is approached so closely by a part of the piston matched within this area of the cylinder head that at first a small portion of the charge is ignited shortly prior to the end of the compression stroke within the gap forming between the cylinder head and that part of the piston and that the main portion of the charge is combusted, at the earliest, beginning with the top dead center position of the piston.

As a result of these undertaken measures, at first the small portion of the charge in the gap space is seized by the flame up to the upper dead-center position of the piston, whereupon the flame in its entire flame-front width enters and burns simultaneously into the main volume of the combustion space and finally passes through the same up to the outer boundary.

The time required therefor is very short because—starting from the ignition source—the radial extent of the main volume of the combustion space is small, which means that the main portion of the charge burns or combusts in a short period of time after the upper dead-center position.

The pressure gained from the combustion mixture above the piston is attained in its full magnitude shortly after the top dead-center position and can be converted into movement energy over the full piston stroke.

As a result of the very rapid combustion directly after the top dead-center position, an optimum conversion of the mixture energy into movement energy is thus achieved, from which results a very low specific fuel consumption and additionally a reduction of the hydrocarbons in the exhaust gas.

A combustion progress decreasing the fuel consumption and the proportion of the hydrocarbons in the exhaust gas can be attained especially with those solutions in which the longest arc of the flame front in the main volume of the combustion space is greater than the distance between the ignition source and the outer boundary of the main volume of the combustion space.

In internal combustion engines with a combustion space arranged in the piston, the main portion of the charge may be disposed according to the present invention in a combustion space recess constructed ring-segmentlike, which in a preferred embodiment may have a reiniform configuration, whereby the outer circular arc thereof delimiting the combustion space recess is arranged at a slight distance from the piston edge and extends approximately over half the piston circumference.

Provision may be made as a further feature of the present invention in internal combustion engines with suspended valves projecting laterally beyond the cylinder circumference that the outer circular arc delimiting the combustion space recess adjoins the cylinder circumference and that within the area of the valves, pockets are so arranged at the cylinder circumference that they form a continuous extension of the combustion space recess.

With this combustion space configuration, the pockets adjoin in such a compact manner that a fragmentation of the combustion space is avoided.

A characteristic of the combustion progress which corresponds to the embodiments described hereinabove is also attainable in a simple manner in a mixture-compressing internal combustion engine with four valves arranged in the cylinder head in which the main portion of the charge is disposed in a ring-shaped combustion channel adjoining or approximately adjoining the cylinder circumference.

According to another embodiment of the present invention, in a mixture-compressing internal combustion engine with a combustion space arranged in the cylinder head, the combustion space part receiving the main portion of the charge may increase in height from the inner circular arc to the outer circular arc whereby the outer circular arc is located within the area of the cylinder circumference.

With an internal combustion engine having a hemispherically shaped combustion space wall in the cylinder head, that solution is advantageous, in which the piston top includes within the area of the ignition source a raised portion matched to the spherical shape of the cylinder head interior, from which the main volume extends up to an outer boundary of the combustion space extending up to the cylinder circumference.

Also an arrangement of the combustion channel in an internal combustion engine constructed as two-cycle engine is possible and it has proved as appropriate also with those solutions, in which a combustion channel is arranged in the cylinder head, if the main portion of the charge is disposed in a ring-shaped combustion channel whose outer boundary lies within the area of the cylinder circumference.

Accordingly, it is an object of the present invention to provide a mixture-compressing internal combustion engine which avoids by simple means the aforementioned shortcomings and drawbacks encountered in the prior art.

Another object of the present invention resides in a mixture-compressing internal combustion engine, in which a complete combustion of the mixtures takes place throughout the entire combustion space.

A further object of the present invention resides in a mixture-compressing internal combustion engine with applied ignition which is characterized by an improved fuel comsumption and reduced amounts of hydrocarbons in the exhaust gases.

Another object of the present invention resides in a mixture-compressing internal combustion engine in which a favorable energy conversion takes place as a result of a reduced combustion duration of the main portion of the mixture charge and of a higher compression ratio, which enables a reduction of the fuel consumption and a lowering of the proportion of the hydrocarbons in the exhaust gases.

Still another object of the present invention resides in a mixture-compressing internal combustion engine with external auto-ignition, in which the main part of the charge combusts in a relatively very short time after the upper dead-center position of the piston so that the pressure realized from the mixture reaches its full magnitude shortly after the top dead-center position of the piston.

Still a further object of the present invention resides in an internal combustion engine of the type described above in which the pressure realized from the combustion mixture can be converted into movement energy over the full piston stroke.

Another object of the present invention resides in an internal combustion engine of the type described above, in which a fragmentation of the combustion space into various parts thereof, impeding a proper combustion progress and development, is effectively avoided.

A still further object of the present invention resides in an internal combustion engine of the type described above, in which an optimum conversion of the mixture energy into movement energy is attainable.

These and other objects, features and advantages of the present invention will become more apparent from the following description when taken in connection with the accompanying drawing which shows, for purposes of illustration only, several embodiments in accordance with the present invention, and wherein.

Figure 1:
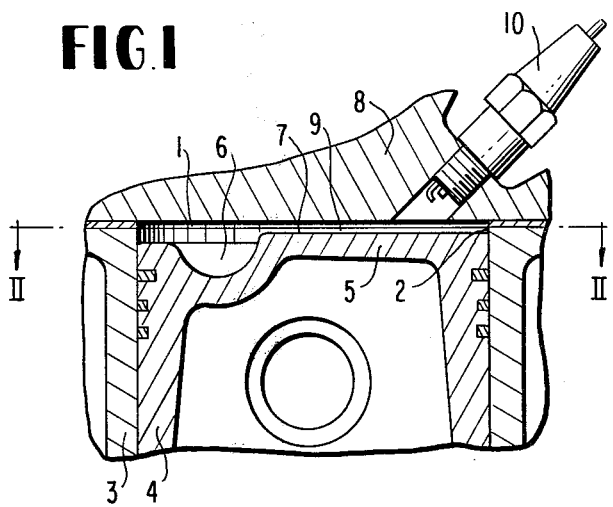
FIG. 1 is a cross-sectional view through a reciprocating piston internal combustion engine with a combustion space arranged in the piston in accordance with the present invention, taken along line I—I in FIG. 2.

In the internal combustion engines with applied ignition described hereinafter which are constructed as four-cycle or two-cycle engines, the main volume of the combustion space—as seen in plan view—is arranged ring-shaped or ring-segmentally-shaped about an ignition source which is so placed that it is directed centrally or approximately centrally on a part of the piston which approaches closest the cylinder head during the compression phase.

The narrow gap which results between the cylinder head and that part of the piston and which encompasses the small part of the charge is so dimensioned that after the ignition initiation, the flame displaced out of the gap enters simultaneously or nearly simultaneously into the main volume of the combustion space and passes through the same in a very short period of time by reason of the short radial dimension of the main portion of the combustion space—as viewed from the ignition source.

The non-combusted fuel components remaining behind initially in the combustion space portion, which were seized by the flame prior to the maximum of combustion space pressure and combustion space temperature, are finally completely combusted by the subsequent pressure and temperature increase as a result of the combustion in the main volume or in the main portion of the combustion space, which has a positive effect finally on the exhaust gas composition especially as regards the proportion of hydrocarbons.

The embodiments in which such a combustion development or progress that decreases the fuel comsumption and the proportion of hydrocarbons in the exhaust gases can be achieved will be described in detail hereinafter whereby similar reference numerals are used throughout the various views to designate like parts.

Figure 2:
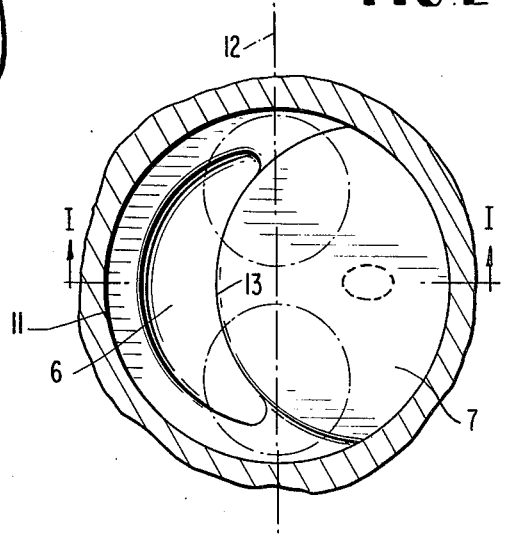
FIG. 2 is a cross-sectional view taken along line II—II of FIG. 1.

In a four-cycle internal combustion engine with applied ignition, as shown in FIGS. 1 and 2, the combustion space 1 is located in a piston 4 guided in the bore 2 of a cylinder block 3, whose piston top 5 includes a combustion space recess 6 accommodating the main portion of the mixture charge which, according to FIG. 2, has a ring-segmentally-shaped configuration. The flattened-off, raised portion 7 of the piston top reaches in the upper dead-center position of the piston 4—this position is shown in FIG. 1—nearly up to the cylinder head 8 covering the bore 2 in the upward direction so closely that a small gap 9 results between the cylinder head 8 and the raised portion 7.

The location of the spark plug 10 is provided at a place in the cylinder head 8, where the combustion space 1 having in this area only a small volume proportion is constructed flat over as wide an area as possible, whereby the gap height is so dimensioned that the danger of the extinction of the flame in this narrow gap 9 or gap space is avoided.

The combustion space recess 6 which extends ring-segmentally-shaped about the flat raised portion 7 and with a slight spacing from the piston edge 11 extends with its end approximately up to a plane 12 (FIG. 2) passing through the valve axes, whereby the inner circular arc 13 or the inner boundary of the reniform combustion space recess 6 is arranged concentrically to the spark plug 10.

By reason of the configuration of the combustion space 1 as well as by reason of the special location of the spark plug 10, the flame passes at first through the flat combustion space portion having only a gap width. Only a slight percentage of the mixture mass is combusted thereby. Thereafter, the flame front passes in a very short period of time through the combustion space recess 6 which is very short in the combustion direction and seizes the essential portion of the mixture.

The ignition is so initiated prior to the top dead-center position of the piston that the flame front has just entered into the combustion space recess 6 beginning in the piston top dead-center position. The main portion of the charge which is assembled in this recess is converted thereby into heat in an extraordinarily short period of time.

The embodiment illustrated in FIGS. 3 and 4 differs from that described hereinabove in that the valves 14 and 15 arranged in the cylinder head 8 project laterally beyond the cylinder circumference.

In order to achieve also in this embodiment the advantage of a reduction of the hydrocarbons and furthermore the advantage of a smaller fuel consumption, pockets 16 and 17 (FIG. 4) are provided along the cylinder circumference within the area of the valves 14 and 15, which are in communication with the combustion space recess 6 and form an extension of this recess 6, so to speak of, whereby the outer boundary adjoins the cylinder circumference. The spark plug position corresponds in this embodiment to the embodiment according to FIG. 1.

Figure 5:
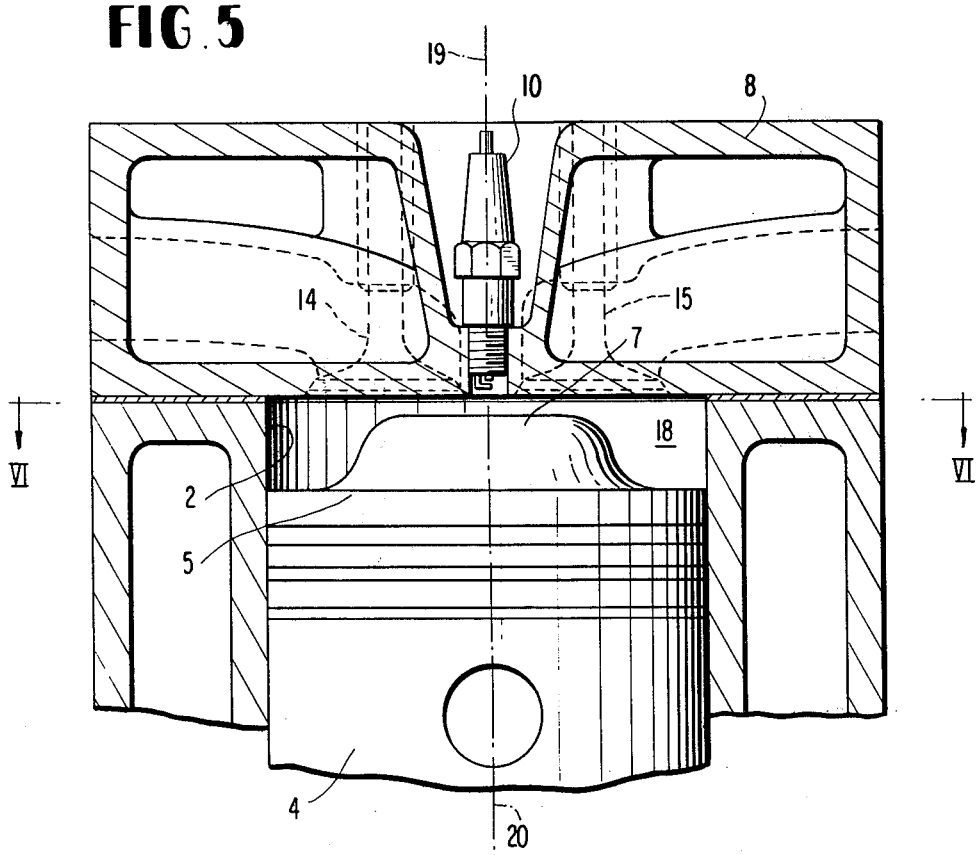
FIG. 5 is a cross-sectional view through a further modified embodiment of an internal combustion engine with four valves coordinated to each cylinder according to the present invention, taken along line V—V of FIG. 6.
Figure 6:
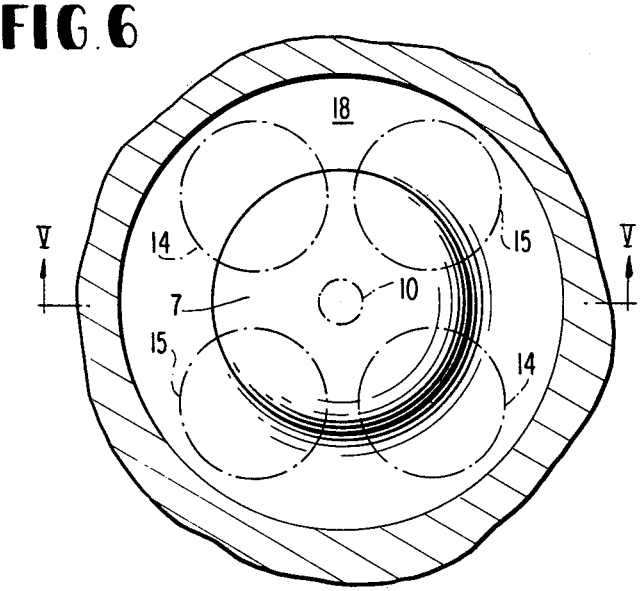
FIG. 6 is a cross-sectional view taken along line VI—VI of FIG. 5.

Another combustion space configuration is illustrated in FIGS. 5 and 6. Since with this mixture-compressing, four-cycle internal combustion engine, two inlet and two exhaust valves each are coordinated to each cylinder, the flattened-off, raised portion 7 is placed centrally over the piston top 5. The piston 7 is surrounded by a ring-shaped combustion space channel 18 accommodating the main portion of the combustion space volume, which channel extends up to the cylinder circumference.

The spark plug 10 is so accommodated in the cylinder head 8 between the four valves that the spark plug axis 19 corresponds approximately to the piston axis 20.

Figure 7:
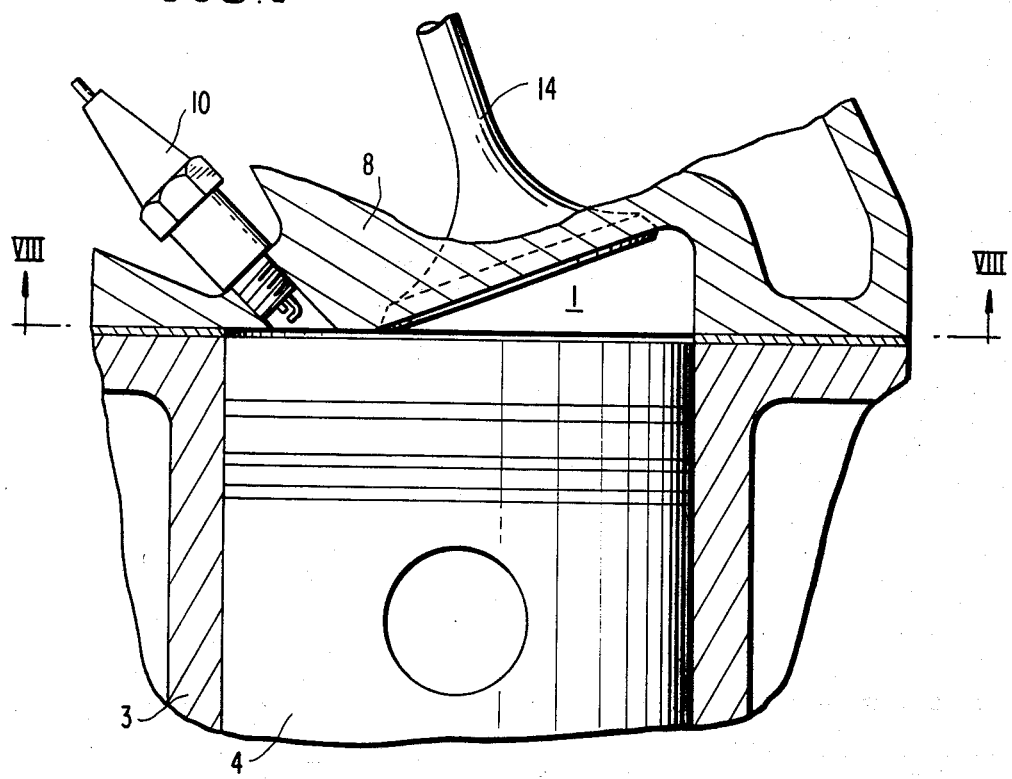
FIG. 7 is a cross-sectional view through an internal combustion engine with a combustion space arranged in the cylinder head according to the present invention, taken along line VII—VII of FIG. 8.
Figure 8:
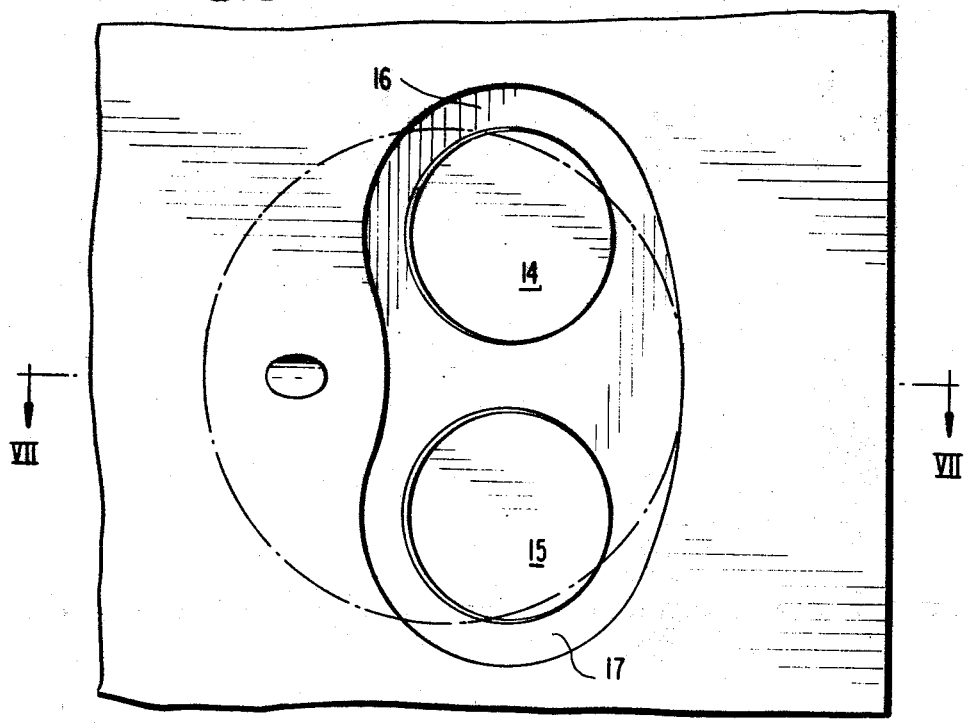
FIG. 8 is a cross-sectional view taken along line VIII—VIII of FIG. 7.

An arrangement of a four-cycle engine with two valves 14 and 15 is illustrated in FIGS. 7 and 8, in which the combustion space 1 is provided in the cylinder head 8.

The main portion of this combustion space 1 increases in height from the inner to the outer boundary thereof as can be seen from FIG. 7.

Figure 3:
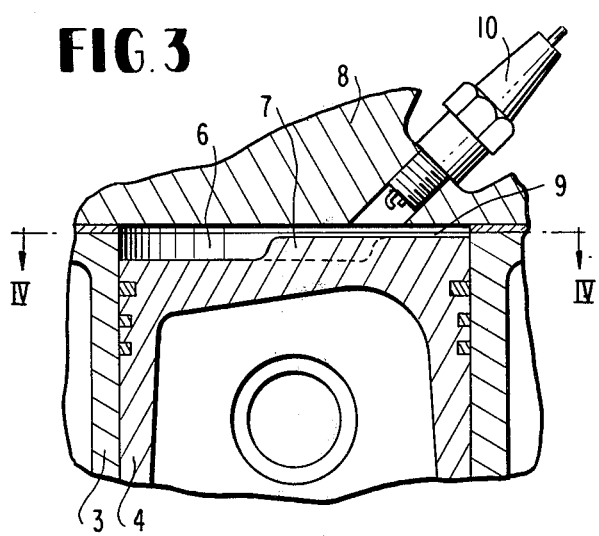
FIG. 3 is a cross-sectional view through another embodiment of an internal combustion engine according to the present invention, taken along line III—III of FIG. 4.
Figure 4:
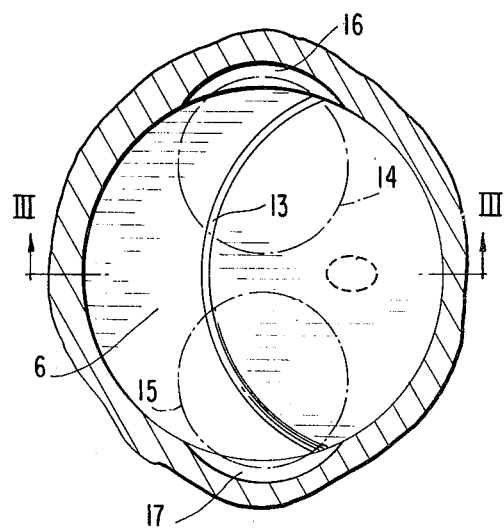
FIG. 4 is a cross-sectional view taken along line IV—IV of FIG. 3.

Since in this embodiment the valves 14 and 15 project laterally beyond the cylinder circumference by reason of their large construction (FIG. 8), also in this embodiment pockets 16 and 17 are provided as extended combustion space which, however, in contrast to the embodiment according to FIGS. 3 and 4 are not located in the upper area within the bore 2 but within the cylinder head 8.

Not only with this arrangement a characteristic of the combustion progress with a view toward a reduction of the harmful components of the exhaust gas corresponding to the embodiments described hereinabove is attainable but also the measures taken in a four-cycle internal combustion engine with a hemispherically shaped combustion space in the cylinder head serve in a similar manner for influencing a better combustion course or progress.

Figure 9:
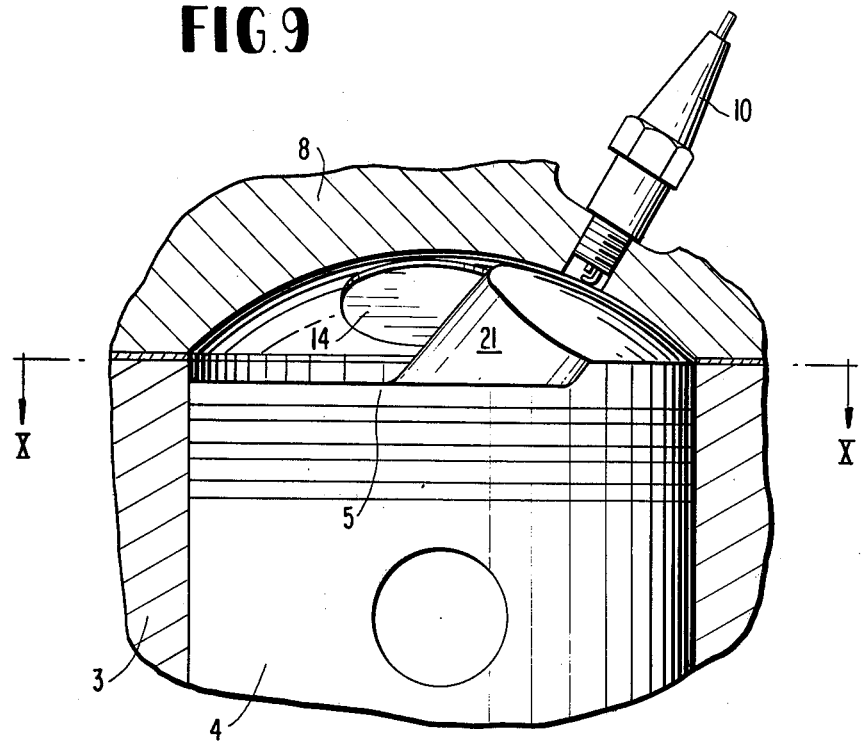
FIG. 9 is a cross-sectional view through a further embodiment of an internal combustion engine according to the present invention, taken along line IX—IX of FIG. 10.
Figure 10:
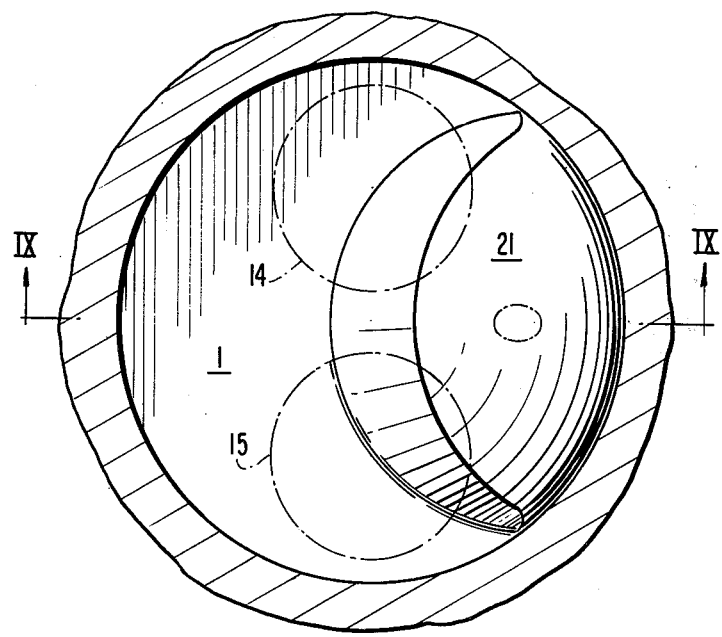
FIG. 10 is a cross-sectional view taken along line X—X of FIG. 9.

The piston top 5 illustrated in FIG. 9 is provided on the side facing the spark plug 10 with a hump or protuberance 21 matched to the cylinder head interior, which terminates approximately in the piston center in the flat combustion space portion accommodating the main volume.

Figure 11:
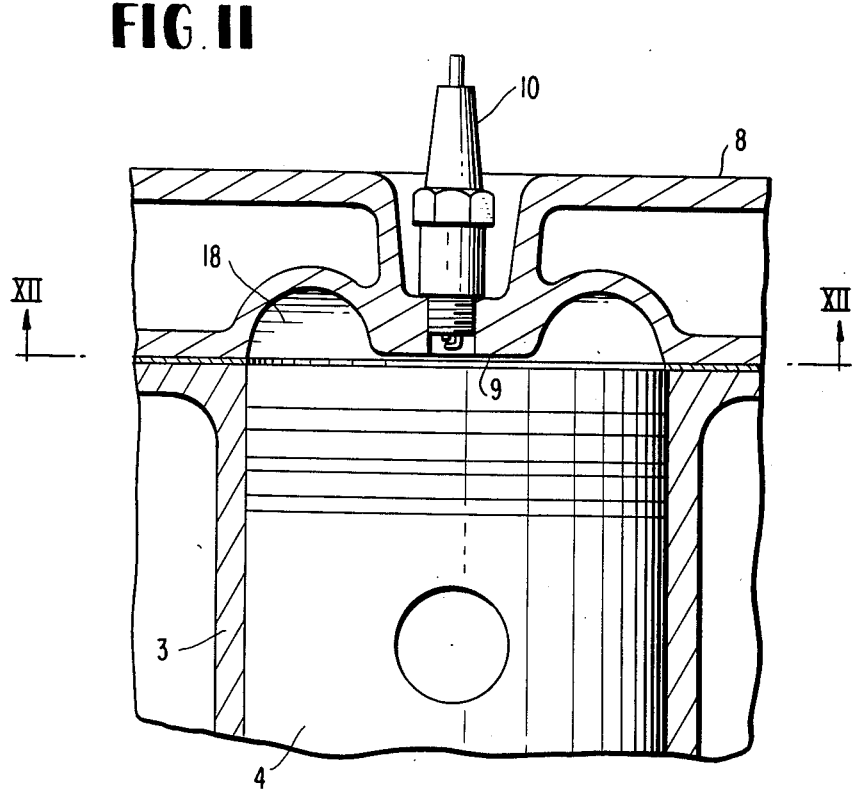
FIG. 11 is a cross-sectional view through an internal combustion engine constructed as two-cycle engine according to the present invention, taken along line XI—XI of FIG. 12.
Figure 12:
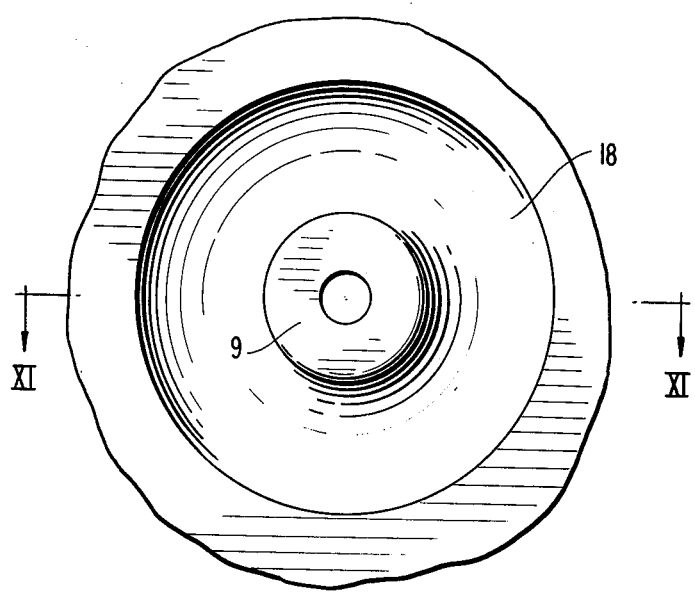
FIG. 12 is a cross-sectional view, taken along line XII—XII of FIG. 11.

In FIG. 11, the cylinder head 8 of a two-cycle internal combustion engine is shown. The spark plug 10 is located in this cyliner head 8 centrally—in relation to the cylinder—and is surrounded by a ring-shaped combustion channel 18 arranged in the cylinder head according to FIG. 12, which radially outwardly adjoins the cylinder circumference.

Of course, the narrow gap space 9 which results during the compression end phase between the ignition area and the piston may also be attained by raised portions of the piston top, whereby the combustion channel 18 is arranged as annular space in the piston top.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A mixture-compressing internal combustion engine including cylinder means, piston means reciprocable in the cylinder means, cylinder head means, a combustion chamber formed in one of two parts consisting of the piston means and the cylinder head means, and an ignition source located in the cylinder head means, characterized in that said combustion chamber includes a main combustion space volume for accommodating a main portion of a fuel charge, the main combustion space volume is delimited by inner and outer boundaries extending along at least approximately circular arcs, as viewed in a plan view, the inner boundary is formed as a boundary wall and is disposed the nearest to the ignition source and is at least approximately concentric to the ignition source, a part of said piston means at least within an area of the ignition source has a matching configuration to the cylinder head means so as to form a small gap for accommodating a small portion of a fuel charge between the cylinder head means and said part of the piston means shortly prior to an end of the compression stroke whereby, with an igniting by the ignition source, the smaller portion of the fuel charge is initially ignited in the small gap with the main portion of the fuel charge being combusted, at the earliest, beginning with an upper deadcenter position of the piston means.

2. A mixture-compressing internal combustion engine according to claim 1, characterized in that the engine is a four-cycle engine.

3. A mixture-compressing internal combustion engine according to claim 1, characterized in that the main combustion space volume is delimited by inner and outer boundary walls extending along circular arcs with the inner arcuate boundary wall nearest to the ignition source being disposed concentrically about the ignition source.

4. A mixture-compressing internal combustion engine including cylinder means, piston means reciprocable in the cylinder means, cylinder head means, a combustion chamber formed in one of two parts consisting of the piston means and the cylinder head means, and an ignition source located in the cylinder head means, characterized in that said combustion chamber includes a main combustion space volume for accommodating a main portion of a fuel charge, the main combustion space volume is delimited by inner and outer boundaries extending along at least approximately circular arcs, as viewed in a plan view, the inner boundary is formed as a boundary wall and is disposed the nearest to the ignition source and is at least approximately concentric to the ignition source, a part of said piston means at least within an area of the ignition source has a matching configuration to the cylinder head means so as to form a small gap for accommodating a small portion of a fuel charge between the cylinder head means and said part of the piston means shortly prior to an end of the compression stroke whereby, with an igniting by the ignition source, the smaller portion of the fuel charge is initially ignited in the small gap with the main portion of the fuel charge being combusted, at the earliest, beginning with an upper dead center position of the piston means, the main combustion space volume is disposed with respect to the ignition source such that, upon an ignition of the ignition source, a longest arc of a flame front is larger than a distance between the ignition source and the outer boundary of the main combustion space volume, and in that the main combustion space volume is formed as a ring-segmented for accommodating the main portion of the fuel charge.

5. A mixture-compressing internal combustion engine according to claim 4, characterized in that said ring-segment recess is disposed in a top surface of the piston means.

6. A mixture-compressing internal combustion engine according to claim 4, characterized in that said ring-segment recess is disposed in the cylinder head means.

7. A mixture-compressing internal combustion engine according to claim 5, characterized in that the ring-segment recess has an essentially reniform shape with the outer circular arcuate boundary delimiting the recess being formed as a boundary wall arranged at a slight distance from an edge of the piston means, and in that the ring-segment recess extends approximately over half a circumference of the piston means.

8. A mixture-compressing internal combustion engine according to claim 5, with suspended valve means projecting laterally beyond a circumference of the cylinder means, characterized in that the outer circular arcuate boundary delimiting the recess adjoins the circumference of the cylinder means, and in that pockets are arranged at the circumference of the cylinder means within an area of the valve means so as to form a continuous extension of the recess.

9. A mixture-compressing internal combustion engine according to claim 4, with four valves arranged in the cylinder head means, characterized in that the main combustion space volume is a ring-shaped combustion channel for receiving the main portion of the fuel charge, the ring-shaped combustion channel at least approximately adjoins a circumference of the cylinder means.

10. A mixture-compressing internal combustion engine according to claim 4, characterized in that the main combustion space is disposed in the cylinder head means, and in that the main combustion space volume increases in height from the inner boundary wall arranged nearest the ignition source to the outer boundary located within an area of a circumference of the cylinder means.

11. A mixture-compressing internal combustion engine according to claim 4, characterized in that the combustion chamber is disposed within the cylinder head means and includes a hemispherically shaped concave wall, and in that the part of the piston means matched to the cylinder head means is a raised semi-convex portion provided on a top of the piston means, the raised portion is matched to the hemispherical shape of the cylinder head means, and in that the outer boundary of the main combustion space volume is located at a circumference of the cylinder means.

12. A mixture-compressing internal combustion engine according to claim 4, as a two-cycle engine characterized in that the combustion chamber is disposed in the cylinder head means, and in that the main combustion space volume is formed as a ring-shaped combustion channel having the outer boundary located within an area of a circumference of the cylinder means.

13. A mixture-compressing internal combustion engine according to claim 1, characterized in that the main combustion space volume is formed as a ring-segment for accommodating the main portion of the fuel charge.

14. A mixture-compressing internal combustion engine according to claim 13, characterized in that said ring-segment recess is disposed in a top surface of the piston means.

15. A mixture-compressing internal combustion engine according to claim 13, characterized in that said ring-segment recess is disposed in the cylinder head means.

16. A mixture-compressing internal combustion engine according to claim 1, characterized in that the main combustion volume has an essentially reniform shape with the outer circular arcuate boundary delimiting the main combustion volume being disposed at a slight distance from an edge of the piston means, and in that the main combustion volume extends approximately over half of a circumference of the piston means.

17. A mixture-compressing internal combustion engine according to claim 1, with suspended valve means projecting laterally beyond a circumference of the cylinder means, characterized in that the outer circular arcuate boundary delimiting the main combustion space volume adjoins the circumference of the cylinder means, and in that pockets are arranged at the circumference of the cylinder means within an area of the valve means so as to form a continuous extension of the main combustion space volume.

18. A mixture-compressing internal combustion engine according to claim 1, with four valves arranged in the cylinder head means, characterized in that the main combustion space volume is a ring-shaped combustion channel for receiving the main portion of the fuel charge, the ring-shaped combustion channel at least approximately adjoins a circumference of the cylinder means.

19. A mixture-compressing internal combustion engine according to claim 1, characterized in that the combustion chamber is disposed in the cylinder head means, and in that the main combustion space volume increases in height from the inner boundary wall to the outer boundary located within an area of a circumference of the cylinder means.

20. A mixture-compressing internal combustion engine according to claim 1, characterized in that the combustion chamber is disposed within the cylinder head means and includes a hemispherically shaped concave wall, and in that the part of the piston means matched to the cylinder head means is a raised semiconvex portion provided on a top of the piston means, the raised portion is matched to the hemispherical shape of the cylinder head means, and in that the outer boundary of the main combustion space volume is located at a circumference of the cylinder means.

21. A mixture-compressing internal combustion engine according to claim 1, as a two-cycle engine characterized in that the combustion chamber is disposed in the cylinder head means, and in that the main combustion space volume is formed as a ring-shaped combustion channel having the outer boundary located within an area of a circumference of the cylinder means.

* * * * *